(12) United States Patent
Messa et al.

(10) Patent No.: US 7,966,213 B2
(45) Date of Patent: Jun. 21, 2011

(54) SYSTEM AND METHOD FOR AUTOMATIC REVIEW OF TRAVEL CHANGES AND IMPROVED SUGGESTIONS AND RULES SET

(75) Inventors: Suzette Messa, Ben Lomond, CA (US); Mark Orttung, Menlo Park, CA (US)

(73) Assignee: Rearden Commerce, Inc., Foster City, CA (US)

( * ) Notice: Subject to any disclaimer, the term of this patent is extended or adjusted under 35 U.S.C. 154(b) by 948 days.

(21) Appl. No.: 11/549,957

(22) Filed: Oct. 16, 2006

(65) Prior Publication Data

US 2008/0091481 A1   Apr. 17, 2008

(51) Int. Cl.
G06Q 10/00 (2006.01)
G06F 17/00 (2006.01)

(52) U.S. Cl. .............................. 705/7.37; 705/5; 705/400

(58) Field of Classification Search .................. 705/7, 5, 705/400
See application file for complete search history.

(56) References Cited

U.S. PATENT DOCUMENTS

| | | | |
|---|---|---|---|
| 5,021,953 A * | 6/1991 | Webber et al. ..................... 705/6 |
| 5,191,523 A | 3/1993 | Whitesage |
| 5,237,499 A | 8/1993 | Garback |
| 5,319,542 A | 6/1994 | King et al. |
| 5,331,546 A | 7/1994 | Webber et al. |
| 5,475,740 A | 12/1995 | Biggs et al. |
| 5,570,283 A | 10/1996 | Shoolery et al. |
| 5,655,008 A | 8/1997 | Futch et al. |
| 5,732,398 A | 3/1998 | Tagawa |
| 5,799,286 A | 8/1998 | Morgan et al. |
| 5,819,092 A | 10/1998 | Ferguson et al. |
| 5,832,451 A | 11/1998 | Flake et al. |
| 5,832,453 A | 11/1998 | O'Brien |
| 5,839,114 A | 11/1998 | Lynch et al. |
| 5,842,178 A | 11/1998 | Giovannoli |

(Continued)

FOREIGN PATENT DOCUMENTS

CA    2291463    6/2001

OTHER PUBLICATIONS

WorldTravel BTI Enhances Non-Refundable Tracker With Comprehensive Tracking and Reporting; Improved Offering Helps Corporations Understand and Manage Their Non-Refundable Ticket Patterns, PR Newswire, Jun. 4, 2003.*

(Continued)

*Primary Examiner* — John W Hayes
*Assistant Examiner* — Kevin Flynn
(74) *Attorney, Agent, or Firm* — Greenberg Traurig, LLP

(57) ABSTRACT

In one embodiment, a method that can be performed on a system, is provided for automatic review of travel changes and improved suggestions and rules set. In one embodiment, the method comprises generating an aggregate of travel history data based on one or more travelers, the data including changes made to travel selections of an itinerary following an initial purchase of the travel selections; receiving a request for travel options in relation to a requested travel itinerary; and generating a first set of travel options for the requested travel itinerary, based at least in part on the aggregate of travel history data, the first set of travel options to result in a cost lower than a second set of travel options, if changes are made to selected travel options of the requested travel itinerary following an initial purchase of the selected travel options.

19 Claims, 2 Drawing Sheets

U.S. PATENT DOCUMENTS

| | | | |
|---|---|---|---|
| 5,852,812 A | 12/1998 | Reeder | |
| 5,870,721 A | 2/1999 | Norris | |
| 5,893,077 A | 4/1999 | Griffin | |
| 5,897,620 A | 4/1999 | Walker et al. | |
| 5,948,040 A | 9/1999 | DeLorme et al. | |
| 5,987,425 A | 11/1999 | Hartman et al. | |
| 5,991,742 A | 11/1999 | Tran | |
| 6,018,715 A | 1/2000 | Lynch et al. | |
| 6,023,679 A | 2/2000 | Acebo et al. | |
| 6,029,144 A | 2/2000 | Barrett et al. | |
| 6,058,375 A | 5/2000 | Park | |
| 6,070,798 A | 6/2000 | Nethery | |
| 6,119,094 A | 9/2000 | Lynch et al. | |
| 6,195,420 B1 | 2/2001 | Tognazzini | |
| 6,230,204 B1 | 5/2001 | Fleming | |
| 6,295,521 B1 | 9/2001 | DeMarcken et al. | |
| 6,304,850 B1 | 10/2001 | Keller et al. | |
| 6,377,932 B1 | 4/2002 | DeMarcken | |
| 6,411,940 B1 | 6/2002 | Egendorf | |
| 6,442,526 B1 | 8/2002 | Vance et al. | |
| 6,477,520 B1 * | 11/2002 | Malaviya et al. | 706/47 |
| 6,571,213 B1 | 5/2003 | Altendahl et al. | |
| 6,622,084 B2 | 9/2003 | Cardno et al. | |
| 6,701,311 B2 | 3/2004 | Biebesheimer et al. | |
| 6,711,548 B1 | 3/2004 | Rosenblatt | |
| 6,715,073 B1 | 3/2004 | An et al. | |
| 6,816,882 B1 | 11/2004 | Conner et al. | |
| 6,839,679 B1 | 1/2005 | Lynch et al. | |
| 6,842,737 B1 | 1/2005 | Stiles et al. | |
| 6,847,988 B2 | 1/2005 | Toyouchi et al. | |
| 6,904,411 B2 | 6/2005 | Hinkle | |
| 6,959,298 B1 | 10/2005 | Silverbrook et al. | |
| 6,959,327 B1 | 10/2005 | Vogl et al. | |
| 6,961,773 B2 | 11/2005 | Hartman et al. | |
| 6,965,868 B1 | 11/2005 | Bednarek | |
| 6,980,885 B2 | 12/2005 | Ye et al. | |
| 7,006,986 B1 | 2/2006 | Sines et al. | |
| 7,050,986 B1 | 5/2006 | Vance et al. | |
| 7,076,451 B1 | 7/2006 | Coupland et al. | |
| 7,080,096 B1 | 7/2006 | Imamura | |
| 7,117,170 B1 | 10/2006 | Bennett et al. | |
| 7,136,821 B1 | 11/2006 | Kohavi et al. | |
| 7,139,728 B2 | 11/2006 | Rigole | |
| 7,194,417 B1 | 3/2007 | Jones | |
| 7,206,763 B2 | 4/2007 | Turk | |
| 7,206,768 B1 | 4/2007 | deGroeve et al. | |
| 7,222,084 B2 | 5/2007 | Archibald et al. | |
| 7,228,313 B1 | 6/2007 | Hand et al. | |
| 7,236,957 B2 | 6/2007 | Crosson | |
| 7,272,568 B1 | 9/2007 | Birch et al. | |
| 7,272,626 B2 | 9/2007 | Sahai et al. | |
| 7,302,399 B1 | 11/2007 | Donovan et al. | |
| 7,315,824 B2 | 1/2008 | Chen et al. | |
| 7,356,516 B2 | 4/2008 | Richey et al. | |
| 7,363,242 B2 | 4/2008 | Lewis et al. | |
| 7,363,267 B1 | 4/2008 | Vincent et al. | |
| 7,379,890 B2 | 5/2008 | Myr et al. | |
| 7,388,495 B2 | 6/2008 | Fallin et al. | |
| 7,401,029 B2 | 7/2008 | Gillespie | |
| 7,451,106 B1 | 11/2008 | Gindlesperger | |
| 7,457,950 B1 | 11/2008 | Brickell et al. | |
| 7,496,520 B1 | 2/2009 | Handel et al. | |
| 7,499,864 B2 | 3/2009 | Campbell et al. | |
| 7,539,620 B2 | 5/2009 | Winterton et al. | |
| 7,548,615 B2 | 6/2009 | Bhalgat et al. | |
| 7,562,027 B1 | 7/2009 | Baggett et al. | |
| 7,574,372 B2 | 8/2009 | Among et al. | |
| 7,587,370 B2 | 9/2009 | Himmelstein | |
| 7,596,566 B1 | 9/2009 | Patwardhan | |
| 7,599,877 B1 | 10/2009 | Cole et al. | |
| 7,660,743 B1 | 2/2010 | Messa et al. | |
| 2001/0003815 A1 | 6/2001 | Nakano | |
| 2001/0051917 A1 | 12/2001 | Biaaonette et al. | |
| 2002/0010612 A1 | 1/2002 | Smith et al. | |
| 2002/0016729 A1 | 2/2002 | Breitenbach et al. | |
| 2002/0059092 A1 | 5/2002 | Naito et al. | |
| 2002/0095347 A1 | 7/2002 | Cummiskey | |
| 2002/0103693 A1 | 8/2002 | Bayer et al. | |
| 2002/0111886 A1 | 8/2002 | Chenevich et al. | |
| 2002/0120478 A1 | 8/2002 | Tanaka | |
| 2002/0120548 A1 | 8/2002 | Etkin | |
| 2002/0143677 A1 * | 10/2002 | Prakash | 705/35 |
| 2002/0152101 A1 | 10/2002 | Lawson et al. | |
| 2002/0156687 A1 | 10/2002 | Carr et al. | |
| 2002/0184102 A1 | 12/2002 | Markopoulos et al. | |
| 2003/0023463 A1 * | 1/2003 | Dombroski et al. | 705/5 |
| 2003/0036930 A1 | 2/2003 | Matos et al. | |
| 2003/0036981 A1 | 2/2003 | Vaughan et al. | |
| 2003/0040987 A1 | 2/2003 | Hudson et al. | |
| 2003/0046195 A1 | 3/2003 | Mao | |
| 2003/0050879 A1 | 3/2003 | Rosen et al. | |
| 2003/0078800 A1 | 4/2003 | Salle et al. | |
| 2003/0105711 A1 | 6/2003 | O'Neil | |
| 2003/0110062 A1 | 6/2003 | Mogler et al. | |
| 2003/0110136 A1 | 6/2003 | Wells et al. | |
| 2003/0120477 A1 | 6/2003 | Kruk et al. | |
| 2003/0120526 A1 | 6/2003 | Altman et al. | |
| 2003/0149653 A1 | 8/2003 | Penney et al. | |
| 2003/0177045 A1 | 9/2003 | Fitzgerald et al. | |
| 2003/0182413 A1 | 9/2003 | Allen et al. | |
| 2003/0191725 A1 | 10/2003 | Ratliff et al. | |
| 2003/0200111 A1 | 10/2003 | Damji | |
| 2003/0204474 A1 | 10/2003 | Capek et al. | |
| 2003/0229529 A1 | 12/2003 | Mui et al. | |
| 2003/0236722 A1 | 12/2003 | Kamel | |
| 2004/0002876 A1 | 1/2004 | Sommers et al. | |
| 2004/0034593 A1 | 2/2004 | Toneguzzo et al. | |
| 2004/0044556 A1 | 3/2004 | Brady et al. | |
| 2004/0044600 A1 | 3/2004 | Chu et al. | |
| 2004/0044644 A1 | 3/2004 | Brady et al. | |
| 2004/0044673 A1 | 3/2004 | Brady et al. | |
| 2004/0044681 A1 | 3/2004 | Brady et al. | |
| 2004/0049413 A1 | 3/2004 | Momma et al. | |
| 2004/0073615 A1 | 4/2004 | Darling | |
| 2004/0117275 A1 | 6/2004 | Billera | |
| 2004/0143498 A1 | 7/2004 | Umeda | |
| 2004/0143522 A1 | 7/2004 | Wall et al. | |
| 2004/0153348 A1 | 8/2004 | Garback | |
| 2004/0167808 A1 | 8/2004 | Fredericks et al. | |
| 2004/0193457 A1 | 9/2004 | Shogren | |
| 2004/0210487 A1 | 10/2004 | Fujimoto et al. | |
| 2004/0249684 A1 | 12/2004 | Karppinen | |
| 2004/0249745 A1 | 12/2004 | Baaren | |
| 2004/0260601 A1 | 12/2004 | Brief | |
| 2004/0260603 A1 | 12/2004 | Marmotta | |
| 2005/0004819 A1 * | 1/2005 | Etzioni et al. | 705/5 |
| 2005/0004830 A1 | 1/2005 | Rozell et al. | |
| 2005/0033614 A1 * | 2/2005 | Lettovsky et al. | 705/5 |
| 2005/0033616 A1 | 2/2005 | Vavul et al. | |
| 2005/0033631 A1 | 2/2005 | Wefers et al. | |
| 2005/0043985 A1 | 2/2005 | Gillespie | |
| 2005/0043996 A1 | 2/2005 | Silver | |
| 2005/0060271 A1 | 3/2005 | Vig | |
| 2005/0065821 A1 | 3/2005 | Kalies | |
| 2005/0086088 A1 | 4/2005 | Stiles et al. | |
| 2005/0108069 A1 | 5/2005 | Shiran et al. | |
| 2005/0108153 A1 | 5/2005 | Thomas et al. | |
| 2005/0119809 A1 | 6/2005 | Chen | |
| 2005/0120052 A1 | 6/2005 | Miller et al. | |
| 2005/0132006 A1 | 6/2005 | Horvitz et al. | |
| 2005/0138175 A1 | 6/2005 | Kumar et al. | |
| 2005/0165629 A1 | 7/2005 | Bruns | |
| 2005/0182713 A1 | 8/2005 | Marchesi | |
| 2005/0197913 A1 | 9/2005 | Grendel et al. | |
| 2005/0197915 A1 | 9/2005 | Biwer et al. | |
| 2005/0216375 A1 | 9/2005 | Grendel et al. | |
| 2005/0273345 A1 | 12/2005 | Castillejo | |
| 2005/0283389 A1 | 12/2005 | Widjaja et al. | |
| 2005/0288973 A1 * | 12/2005 | Taylor et al. | 705/5 |
| 2006/0010023 A1 | 1/2006 | Tromczynski et al. | |
| 2006/0037016 A1 | 2/2006 | Saha et al. | |
| 2006/0059021 A1 | 3/2006 | Yulman et al. | |
| 2006/0100909 A1 | 5/2006 | Glimp et al. | |
| 2006/0101467 A1 | 5/2006 | Buco et al. | |
| 2006/0123088 A1 | 6/2006 | Simmons et al. | |
| 2006/0143087 A1 | 6/2006 | Tripp et al. | |
| 2006/0190314 A1 | 8/2006 | Hernandez | |

| | | | |
|---|---|---|---|
| 2006/0212321 A1* | 9/2006 | Vance et al. ............. 705/5 |
| 2006/0224423 A1 | 10/2006 | Sun et al. |
| 2006/0241966 A1 | 10/2006 | Walker et al. |
| 2006/0259335 A1 | 11/2006 | La Macchia et al. |
| 2006/0283935 A1 | 12/2006 | Henry et al. |
| 2007/0005406 A1 | 1/2007 | Assadian et al. |
| 2007/0021991 A1 | 1/2007 | Etzioni et al. |
| 2007/0038566 A1 | 2/2007 | Shestakov et al. |
| 2007/0043651 A1 | 2/2007 | Xiao et al. |
| 2007/0156546 A1 | 7/2007 | Oppert et al. |
| 2007/0174154 A1 | 7/2007 | Roberts et al. |
| 2007/0239548 A1 | 10/2007 | Sears |
| 2007/0273499 A1 | 11/2007 | Chlubek et al. |
| 2008/0004964 A1 | 1/2008 | Messa |
| 2008/0065408 A1 | 3/2008 | Salonen |
| 2008/0091481 A1 | 4/2008 | Messa |
| 2008/0319808 A1 | 12/2008 | Wofford et al. |
| 2009/0006142 A1 | 1/2009 | Orttung |
| 2009/0125355 A1 | 5/2009 | Handel |
| 2010/0191572 A1 | 7/2010 | Newman et al. |

OTHER PUBLICATIONS

Aberdeen Group, Inc., "Xerox Scraps Paper for an Automated Expense Management Solution and Sees Multiple Millions in Return," Aberdeen Group OnSite: Best Practices, 2002.

Amadeus IT Group SA, "End to End Travel Management from Travel Booking to Expense Management," May 2, 2007.

Business Editors, "Accenture and Captura Form Alliance to Provide Web-Enabled Expense Management Solutions," Business Wire, Aug. 13, 2001.

Datasheet, Gelco Reservation Manager 2.0, Gelco Information Network, Inc., 2003.

Extensity, Inc., "Extensity, Amadeus and e-Travel Team to Provide Integrated Travel and Expense Management Solution," Oct. 24, 2001.

Fair Isaac Corporation, "What's in Your Score," www.myfico.com, Feb. 9, 2005.

Farber, Dan, "Rearden Commerce Transforms Business Services," ZDNet, Feb. 27, 2005.

IBM Corporation, "American Express, IBM Join Forces to Offer Easy-to-Use Online Tool for Reporting, Reconciling Business Expenses," Mar. 5, 2002.

IBM Corporation, "IBM Introduces Electronic Expense Reporting Solution to Help Companies Eliminate Reimbursement Paper Trail" Aug. 3, 1998.

Zhu, Guangyu et al., "Extracting Relevant Named Entities for Automated Expense Reimbursement," Proceedings of the 13th ACM SIGKDD International Conference on Knowledge Discovery and Data Mining, San Jose, CA, Aug. 2007.

Aggarwal, Gautam et al., U.S. Appl. No. 11/319,911, entitled "Method and System for Ranking Services on a Variable Scale of Compliance", filed Dec. 27, 2005.

Billington, Corey A. et al., U.S. Appl. No. 11/093,615, entitled "Cost Method Analysis and breakdown for Cost Buildup", filed Mar. 29, 2005.

Forshaw, David et al., U.S. Appl. No. 11/324,083, entitled "Method and System to Provide Cumulative Budget and Probabilites for a Return on Expenditure for Policy Enforcement," filed Dec. 29, 2005.

Gertsbakh, Ilya et al., "Periodic transportation schedules with flexible departure time. An interactive approach based on the periodic event scheduling program and the deficit function approach," European Journal of Operational Research, Feb. 15, 1991, pp. 298-309, ScienceDirect, Nov. 3, 2008 <http://www.sciencedirect.com/science/article/B6VCT>.

Handel, Sean et al., U.S. Appl. No. 11/187,484, entitled "System and Method for Optimization of Group Shipments to Reduce Shipping Costs", filed Jul. 22, 2005.

Orttung, Mark et al., U.S. Appl. No. 11/027,115, entitled Apparatus and Method to Provide Community Pricing, filed Dec. 30, 2004.

Orttung, Mark et al., U.S. Appl. No. 11/178,033, entitled "Flexible Policy Application to Reduce Travel Costs", filed Jul. 7, 2005.

Patwardhan, Shantau et al., U.S. Appl. No. 11/066,022, entitled System and Method for Flexible Handling of Rules and Regulations in Temporary Labor Hiring, filed Feb. 24, 2005.

Website: "Tax Consequences of Frequent Flyer Mileage Earned on Business Travel", <http://www.ssbb.com/freqfly.html> , Satterlee Stephens Burke & Burke LLP, May 1997, printed Nov. 3, 2008.

Messa, Suzette et al., U.S. Appl. No. 10/966,556, entitled "System for Optimization of Cost Management", filed Oct. 15, 2004.

Transaction History of U.S. Appl. No. 10/966,556, filed Oct. 15, 2004, entitled "System for Optimization of Cost Management."

Transaction History of U.S. Appl. No. 11/027,115, filed Dec. 30, 2004, entitled "Apparatus and Method to Provide Community Pricing."

Transaction History of U.S. Appl. No. 11/066,022, filed Feb. 24, 2005, entitled "System and Method for Flexible Handling of Rules and Regulations in Temporary Labor Hiring."

Transaction History of U.S. Appl. No. 11/093,615, filed Mar. 29, 2005, entitled "Cost Model Analysis and breakdown for Cost Buildup."

Transaction History of U.S. Appl. No. 11/178,033, filed Jul. 7, 2005, entitled "Flexible Policy Application to Reduce Travel Costs."

Transaction History of U.S. Appl. No. 11/187,484, filed Jul. 22, 2005, entitled "System and Method for Optimization of Group Shipments to Reduce Shipping Costs."

Transaction History of U.S. Appl. No. 11/240,740, filed Sep. 30, 2005, entitled "Method and System for Testing of Policies to Determine Cost Savings."

Transaction History of U.S. Appl. No. 11/319,911, filed Dec. 27, 2005, entitled "Method and System for Ranking Services on a Variable Scale of Compliance."

Transaction History of U.S. Appl. No. 11/324,083, filed Dec. 29, 2005, entitled "Method and System to Provide Cumulative Budget and Probabilities for a Return on Expenditure for Policy Enforcement."

Transaction History of U.S. Appl. No. 11/480,106, filed Jun. 30, 2007, entitled "Method and Systems for Personal Restaurant Assistant."

Transaction History of U.S. Appl. No. 11/549,957, filed Oct. 16, 2006, entitled "System and Method for Automatic Review of Travel Changes and Improved Suggestions and Rules Set."

Transaction History of U.S. Appl. No. 11/768,882, filed Jun. 26, 2007, entitled "System and Method for Tracking Spending Based on Reservations and Payments."

* cited by examiner

SYSTEM AND METHOD FOR AUTOMATIC REVIEW OF TRAVEL CHANGES AND IMPROVED SUGGESTIONS AND RULES SET

CROSS-REFERENCE TO RELATED APPLICATIONS

This application is related to U.S. patent application Ser. No. 11/112,376, Filed Apr. 21, 2005, entitled, "Aggregate Collection Of Travel Data", U.S. patent application Ser. No. 11/178,007, filed Jul. 31, 2005, entitled, "System for Travel Services Resource" U.S. patent application Ser. No. 11/240,739, Filed Sep. 30, 2005, entitled "Method And System For Capturing And Calculating Complex Consumer Ratings Of Goods And Services" and U.S. patent application Ser. No. 11/240,740, filed Sep. 30, 2005 entitled: "Method And System For Testing Of Policies To Determine Cost Savings", all of which are incorporated herein by reference.

BACKGROUND OF THE INVENTION

People often make travel bookings according to a predetermined set of rules, or according to their accustomed travel arrangements. However, certain types of bookings may often result in costly changes at the last minute. It may be that booking different types travel arrangements, for example, in a different travel class with no change penalty, may be a wiser choice for certain bookings, such as, for example, bookings for travel and accommodations for a convention or for a customer meeting that may often require last-minute changes.

What is clearly needed is a system, method and apparatus for tracking booking behavior patterns of travelers, and, based on historical aggregate data and internal and external events, for suggesting better booking methods for initial bookings, resulting in a lower average over-all cost.

SUMMARY

In one embodiment, a method that can be performed on a system is provided for automatic review of travel changes and improved suggestions and rules set. In one embodiment, the method comprises generating an aggregate of travel history data based on one or more travelers, the data including changes made to travel selections of an itinerary following an initial purchase of the travel selections; receiving a request for travel options in relation to a requested travel itinerary; and generating a first set of travel options for the requested travel itinerary, based at least in part on the aggregate of travel history data, the first set of travel options to result in a cost lower than a second set of travel options, if changes are made to selected travel options of the requested travel itinerary following an initial purchase of the selected travel options.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
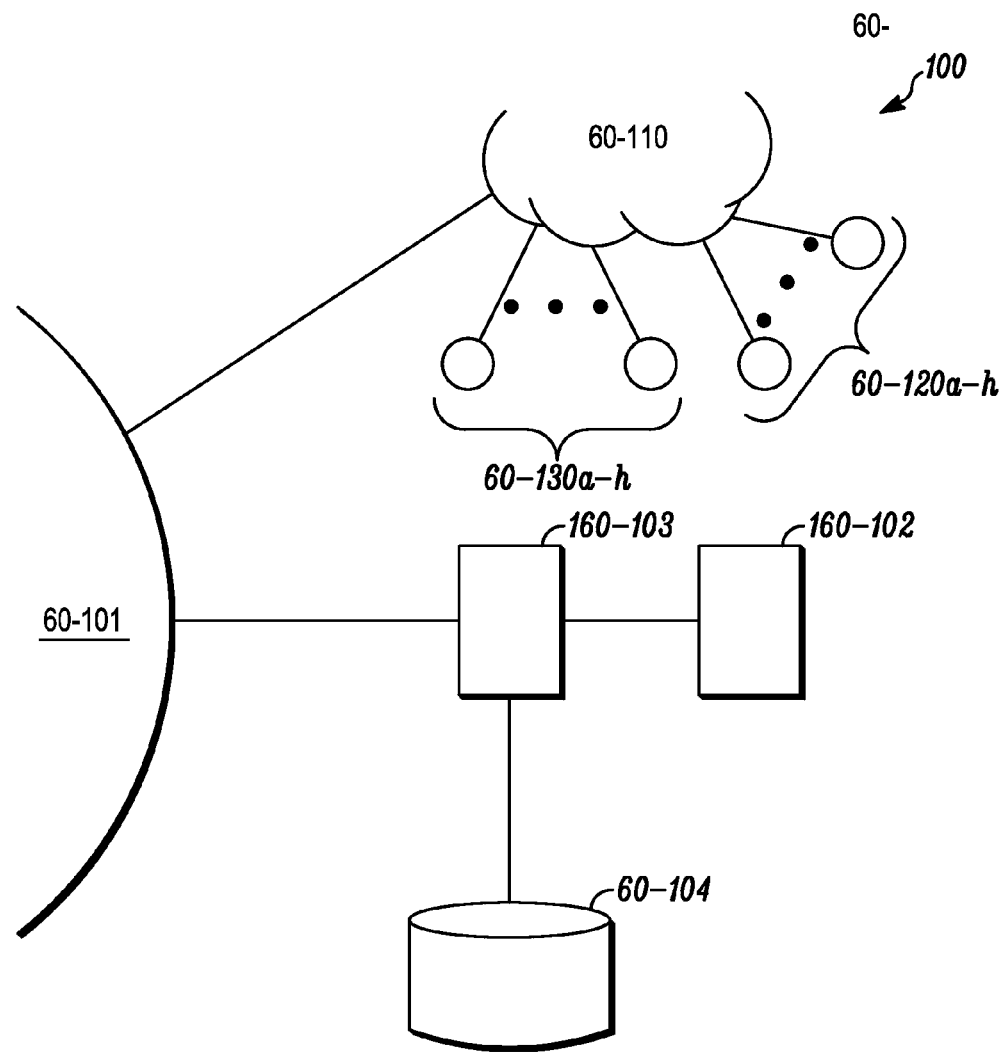
FIG. 1 shows an overview of a system according to one embodiment.

FIG. 1 shows an overview of a system 100 according to the present invention. An electronic services system 101 has a server 102 that hosts a software instance 103 and has access to a data repository or database 104. It is clear that this simplified depiction shows only elements of interest pertaining to the present invention, and that all these elements may be part of a much larger system. Also shown is a connection of electronic services system 101 to the Internet 110, to which users 130a-n and vendors 120a-n are also connected. It is clear that in some cases the users and/or vendors may be connected to services system 101 directly, or through a private network or VPN or some other type of network connection without departing from the spirit of the invention.

Figure 2:
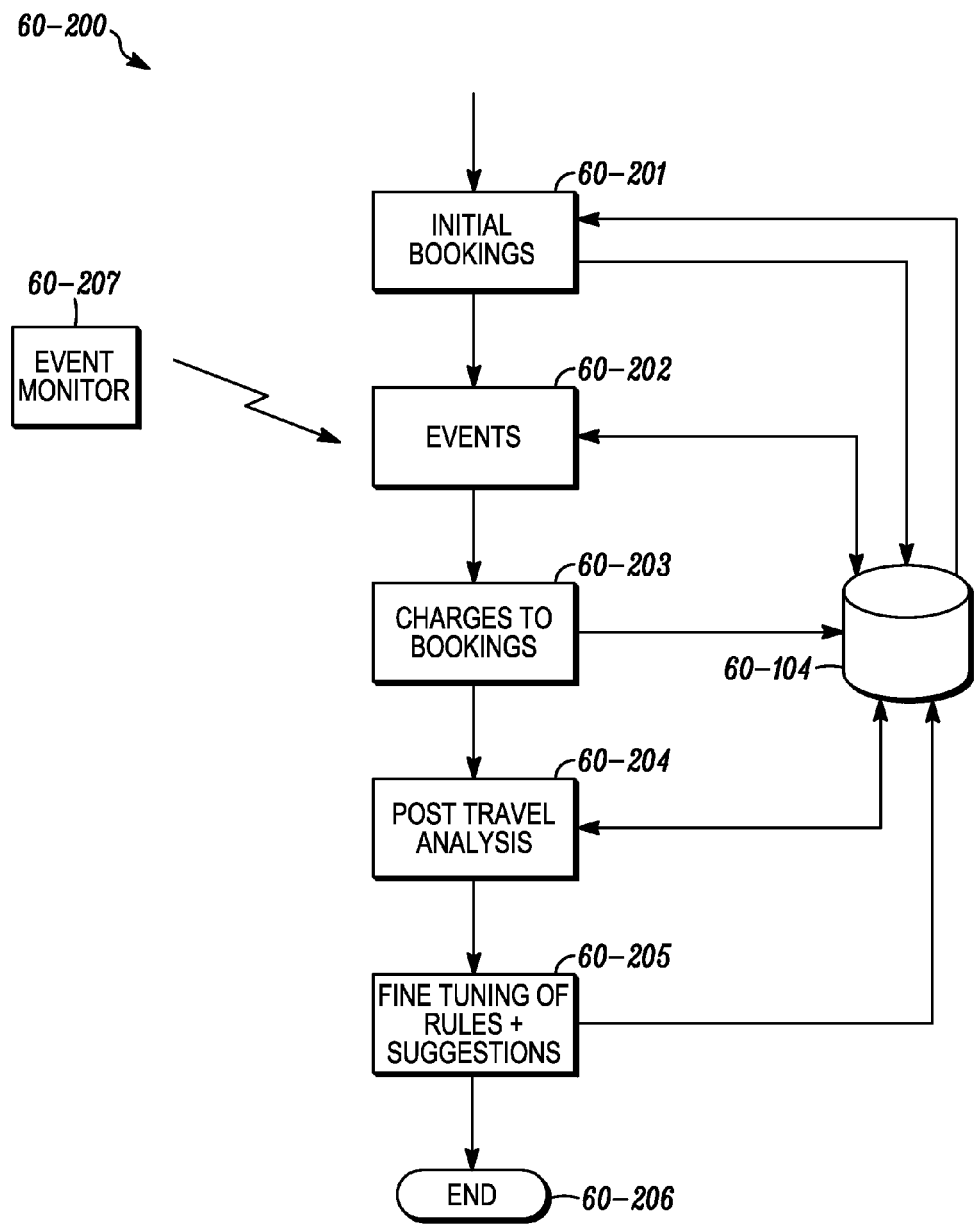
FIG. 2 shows an exemplary process for implementation of the system according to one embodiment.

FIG. 2 shows an exemplary process 200 for implementation of the system according to one embodiment of the present invention. In step 201 a user makes an initial booking, in some cases based on recommendations by the system, which recommendations are stored in database 104. It will be discussed later how these recommendations are generated, but in essence they are based on the rules that apply for this individual user, with some variations as discussed below. In step 202, an event monitor 207 monitors events relevant to the traveler's plans, including events in the traveler's own agenda and schedules within his company, external events along his travel route and at his accommodations (in all the cities and countries that are included in the travel route), and also events at partner companies that he is visiting. Based on those events, in step 203, the user may need to make changes in his bookings. The correlation between the changes and the monitored events are stored in database 104, as well as the changes themselves.

After the traveler returns from his trip, in step 204, the system does a post-travel analysis to determine whether some of the penalties and fees invoked by travel changes could have been avoided or lowered had different types of bookings been made. These analysis results are also stored in database 104. In step 205, the system makes a fine-tuning of rules and suggestions, based on the historic aggregate of relevant travels of both this user and other users who followed the same route, and in step 206, the process ends. For example, a large event at a target location may have led to cancellations or changes in hotel reservations or overbooking of flights, and therefore to unacceptable delays or problems in users' travel plans. Thus the system may determine that the traveler should have initially purchased an unrestricted ticket, allowing him to avoid change penalties, etc.

It is clear that many modifications and variations of this embodiment may be made by one skilled in the art without departing from the spirit of the novel art of this disclosure.

In some cases, a novel aspect of the software system includes attributes for a trip that the electronic services system would look at for both new and historical trips. Some example attributes of a trip could include the following: reason for trip (e.g., sales call, maintenance call, industry conference, internal meeting, etc.), specific parties involved in the trip (e.g., customer A, internal colleague B, industry conference C, etc.), specific location (e.g., a given city, convention center, or a property of a city such as being a European city or an Asian city), timing (e.g., time of year, the fact that the trip is on a Monday or Friday, proximity to a major holiday, etc.), proximity to other activities on a user's calendar (e.g., do other meetings in different cities tightly adjacent introduce additional travel change risk, do tentative, conflicting meetings on the user's calendar make a change more likely), user-defined priority of the event (e.g., the user could state that this is a Tier 1 customer or a Tier 2 customer, which could inform whether the trip is likely to change), and other attributes of the trip, both defined by the user and derived from the attributes of the proposed and past trips.

Additionally, in yet other cases, the system could offer a display of the same booking with different rate/restriction combinations. For example, a hotel room may be available at a given hotel with three options. Option A might have a large penalty for change and a pre-payment requirement, option B might have only a penalty if not cancelled 24 hours ahead, but a higher per night rate, and option C might have a slightly higher rate, but include amenities such as parking, breakfast, and Internet access. In these cases, a novel part of the system would be a display that shows a specific hotel with multiple booking options all in a tightly integrated display.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), and firmware such as electrically erasable programmable read-only memory (EEPROM's).

What is claimed is:

1. A method comprising:
generating, via a computer system, an aggregate of travel history data based on one or more travelers, the data including changes made to travel selections of an itinerary following an initial purchase of the travel selections;
receiving a request for travel options in relation to a requested travel itinerary; and
generating a first set of travel options for the requested travel itinerary based on a determination using the aggregate of travel history data that changes made to selected travel options of the requested travel itinerary following an initial purchase of the selected travel options cause the first set of travel options to result in a cost lower than a second set of travel options;
wherein the generating the first set of travel options further comprises generating the first set of travel options based, at least in part, on one or more external events occurring along a travel route or at an accommodation of the requested travel itinerary.

2. The method of claim 1, wherein the aggregate of travel history data includes travel history data for a traveler of the requested travel itinerary.

3. The method of claim 1, wherein the generating the aggregate of travel history data further comprises performing a post travel analysis to determine whether one of penalties or fees invoked by travel changes could have been less had separate selected travel options been purchased.

4. The method of claim 1, wherein the generating the first set of travel options further comprises generating the first set of travel options based, at least in part, on one or more events comprising events related to a schedule of a traveler during the requested travel itinerary, events related to a first entity, events related to scheduled destinations of the requested itinerary, and events related to a second entity.

5. The method of claim 4, wherein the generating the first set of travel options is based at least in part on events related to the first entity, and the first entity is an employer of the traveler having requested the first set of travel options.

6. The method of claim 4, wherein the generating the first set of travel options is based at least in part on events related to the second entity, and the second entity is an entity located at a destination of the requested travel itinerary.

7. The method of claim 6, wherein the traveler has a scheduled meeting with the second entity during the requested travel itinerary.

8. The method of claim 1, wherein the generating the first set of travel options is further based on a set of one or more attributes comprising an identified purpose of the travel, identified individuals related to the travel, an origin or destination of the travel, a time period of the travel, and a calendar of a traveler of the requested itinerary.

9. The method of claim 1, wherein the first set of travel options includes multiple sets of rate and restrictions for one of the travel options of the first set of travel options.

10. A non-transitory machine readable medium having stored thereon a set of instructions which when executed perform a method comprising:
generating an aggregate of travel history data based on one or more travelers, the data including changes made to travel selections of an itinerary following an initial purchase of the travel selections;
receiving a request for travel options in relation to a requested travel itinerary; and
generating a first set of travel options for the requested travel itinerary based on a determination using the aggregate of travel history data that changes made to selected travel options of the requested travel itinerary following an initial purchase of the selected travel options cause the first set of travel options to result in a cost lower than a second set of travel options.

11. The machine readable medium of claim 10, wherein the aggregate of travel history data includes travel history data for a traveler of the requested travel itinerary.

12. The machine readable medium of claim 10, wherein the generating the aggregate of travel history data further comprises performing a post travel analysis to determine whether one of penalties or fees invoked by travel changes could have been less had separate selected travel options been purchased.

13. The machine readable medium of claim 10, wherein the generating the first set of travel options further comprises generating the first set of travel options based, at least in part, on one or more events related to the requested travel itinerary.

14. The machine readable medium of claim 10, wherein the generating the first set of travel options further comprises generating the first set of travel options based, at least in part, on one or more of events comprising events related to a schedule of a traveler during the requested travel itinerary, events related to a first entity, events related to scheduled destinations of the requested itinerary, and events related to a second entity.

15. The machine readable medium of claim 14, wherein the generating the first set of travel options is based at least in part on events related to the first entity, and the first entity is an employer of the traveler having requested the first set of travel options.

16. The machine readable medium of claim 14, wherein the generating the first set of travel options is based at least in part on events related to the second entity, and the second entity is an entity located at a destination of the requested travel itinerary.

17. The machine readable medium of claim 16, wherein the traveler has a scheduled meeting with the second entity during the requested travel itinerary.

18. The machine readable medium of claim 10, wherein the generating the first set of travel options is further based on a set of one or more attributes comprising an identified purpose of the travel, identified individuals related to the travel, an origin or destination of the travel, a time period of the travel, and a calendar of a traveler of the requested itinerary.

19. The machine readable medium of claim 10, wherein the first set of travel options includes multiple sets of rates and restrictions for one of the travel options of the first set of travel options.

* * * * *